…

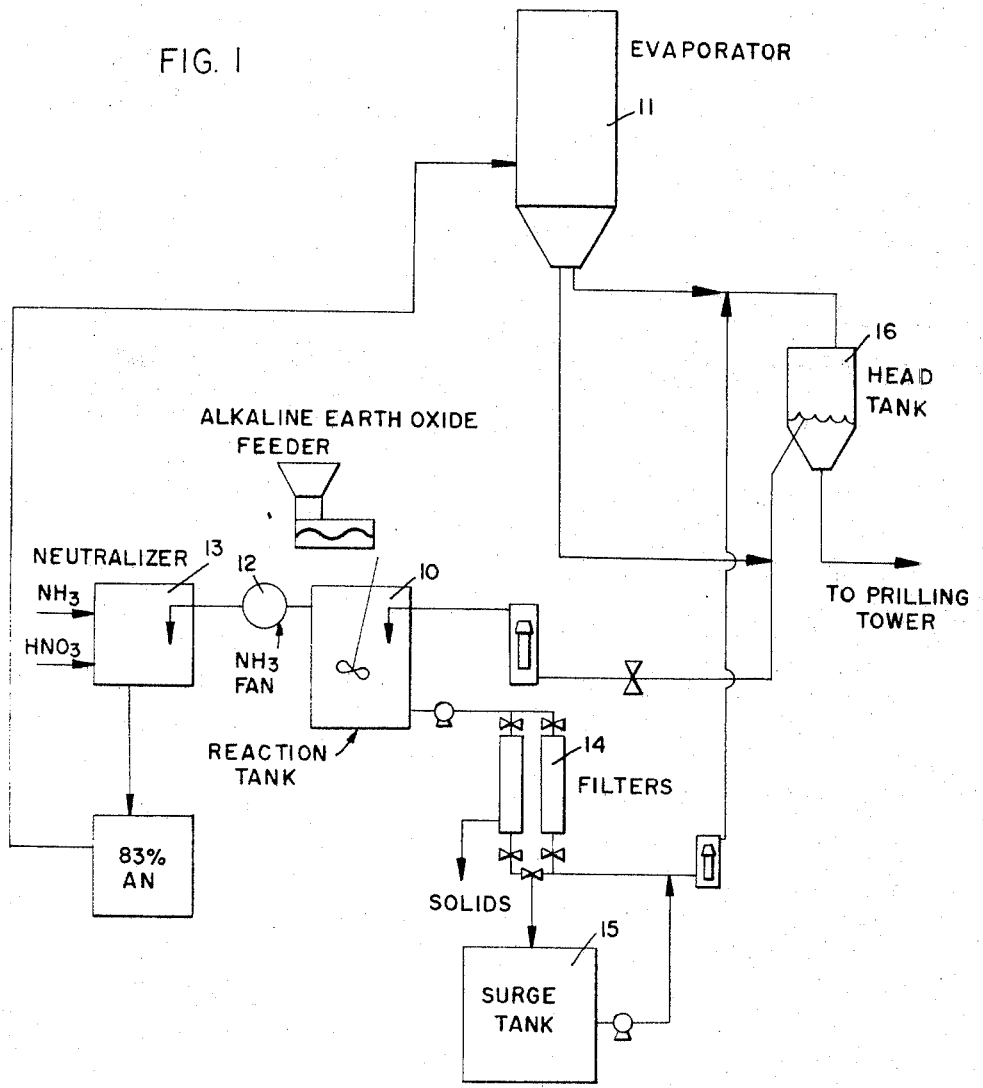

United States Patent Office 3,428,418
Patented Feb. 18, 1969

3,428,418
AMMONIUM NITRATE STABILIZATION
Richard F. McFarlin, Atlanta, Ga., and Donald E. Brown, Lakeland, Fla., assignors, by mesne assignments, to USS Agri-Chemicals Inc., Pittsburgh, Pa., a corporation of Delaware
Continuation-in-part of application Ser. No. 365,867, May 6, 1964. This application June 27, 1967, Ser. No. 651,095
U.S. Cl. 23—103    5 Claims
Int. Cl. C01c 1/18

ABSTRACT OF THE DISCLOSURE

Anhydrous ammonium nitrate is prepared by neutralizing nitric acid with ammonia and the resulting ammonium nitrate concentrated to anhydrous ammonium nitrate. A portion of the anhydrous ammonium nitrate is reacted with agitation with about 6–24 fold excess of an alkaline earth metal oxide, such as magnesium and calcium oxides and alkaline earth metal carbonates and hydroxides, whereby a large volume of ammonia is liberated at a single stage while at the same time ammonium alkaline earth metal nitrates are formed. The evolved ammonia is recovered and recycled to the initial neutralizing nitric acid step while the ammonium and alkaline earth metal nitrates are metered into the concentrated anhydrous ammonium nitrate to reduce the equivalent alkaline earth metal content to a concentration in which the alkaline earth metal oxide content is at least about 0.2 percent by weight so as to stabilize the ammonium nitrate product.

Related application

This is a continuation-in-part of our copending application Ser. No. 365,867, filed May 6, 1964 and now abandoned.

Summary of invention

Ammonium nitrate exists in five enantiotropic forms, which have been described in the literature and are well known. Form IV of these crystalline species is stable from about —18° C. to 32° C. The phase transition that occurs at 32° C. is accomplished by a large volume change which contributes heavily to caking. Phase stabilization for the purposes of this invention is defined as alternating the crystal habit of ammonium nitrate so (1) form IV is the equilibrium crystalline form encountered in ambient storage temperatures, and/or (2) the specific volume changes that accompany the phase transitions are decreased.

It has been known for many years that magnesium and calcium nitrates modify the crystal habit of ammonium nitrate so that the transition that normally occurs at 32° C. is shifted upward to approximately 55° C. and that the modification results in improved anti-caking performance. It has been proposed for commercial practice that aqueous solutions of ammonium nitrate melts be combined with magnesium and calcium nitrates and that water be evaporated from the resulting product to obtain an essentially anhydrous melt. Such a process requires the evaporation of substantial amounts of water.

It has also been previously discovered that the $Mg(NO_3)_2$ must contain substantially less than 6 molecules of water of hydration, i.e., $Mg(NO_3)_2 \cdot 6H_2O$, which is the chemical composition found at normal conditions. The compounds $Mg(NO_3)_2 \cdot H_2O$ and $Mg(NO_3)_2 \cdot 3H_2O$, the species normally used to prepare dimensionally stable $NH_4NO_3$, can only be prepared by exhaustively heating $Mg(NO_3)_2 \cdot 6H_2O$ at elevated temperatures where decomposition to MgO or basic salts occur.

It has also been previously discovered that from an aqueous melt of ammonium nitrate which contains a minor amount of $Mg(NO_3)_2$ in solution, a limited amount of water can be evaporated at the temperatures normally employed in the evaporation of ammonium nitrate. Evaporation to a composition equivalent to $Mg(NO_3)_2 \cdot H_2O$ can only be achieved in vacuum equipment when a concentration equivalent to about 3.0% MgO or less is used. Without a vacuum system, the minimum concentration of water that can be achieved is considerably greater than one mole of water per mole of Mg.

We have discovered that ammonium nitrate can be rendered dimensionally stable by incorporating magnesium or calcium oxides, or mixtures thereof, directly into an anhydrous ammonium nitrate melt, utilizing a large excess of the oxides so as to liberate ammonia in large volume for reuse in the neutralization of nitric acid, and then metering the resulting ammonium nitrate-magnesium or calcium nitrate solution into a molten anhydrous ammonium nitrate substantially free of the alkaline earth metal to produce an anhydrous ammonium nitrate product having the amount of $Mg(NO_3)_2$ and/or $Ca(NO_3)_2$ desired for stabilization of the ammonium nitrate composition. In the foregoing process, the necessity of evaporating water from the blended nitrate salts is avoided, while at the same time a recovery of a large amount of ammonia during the short reaction stage permits economical reuse of the ammonia in the nitric acid neutralization step. The source of the alkaline earth metal is not limited to the oxide although it is the preferred source. The carbonates or hydroxides can be used equally as well.

Drawing

The invention is shown in an illustrative embodiment by the accompanying drawing in which the process steps are schematically illustrated.

Detailed description

Molten ammonium nitrate is metered into the agitated, steam-jacketed reaction tank 10 from the evaporator 11. Alkaline earth oxide is metered into this same reaction tank by means of any suitable solids feeder. An ammonia fan 12 draws off the evolved $NH_3$ and recycles the vapors to the neutralizer 13. Additional $NH_3$ and $HNO_3$ are fed to the neutralizer to prepare the aqueous feed to the evaporator. A product containing about 83% $NH_4NO_3$ exits the neutralizer to a surge tank and is then pumped to the evaporator. The reaction product is taken through filters 14 to remove any unreacted oxide. The solids can be discarded or recycled back to the reaction tank. A surge tank 15 is included to receive the molten, essentially anhydrous filtrate to provide operating convenience. The melt which contains 15–45% $Mg(NO_3)_2$ is pumped to the head tank 16 located on top of the prilling tower and diluted to about 2% $Mg(NO_3)_2$ with a second stream of anhydrous ammonium nitrate from the evaporator. The blended melt in the head tank is prilled or solidified in any suitable manner. We prefer to prill the melt in a relatively short tower with a free fall of about 80 feet. A longer free fall can be used and a shorter free fall can be used by adjusting the flow rate of countercurrent cooling air. The presence of $Mg(NO_3)_2$ slightly lowers the solidification temperature of the melt, but the prilling operation is substantially unaffected by this addition.

A primary object, therefore, of the invention is to provide an improved process for preparing dimensionally stable ammonium nitrate compositions through the incorporation of an excess of magnesium or calcium oxides or mixtures thereof into the ammonium nitrate melt. A further object is to provide a process in which ammonia is recovered in large volume by incorporating an excess of magnesium or calcium oxides or mixtures thereof in molten anhydrous ammonium nitrate. Yet another object is to provide in such a process for the addition of a large excess of the magnesium or calcium oxides so as to recover quickly and in one place a large volume of ammonia, the ammonia being recycled for use in neutralizing nitric acid. A still further object is to provide in an ammonium nitrate stabilization process, steps for incorporating an excess of magnesium or calcium oxides or mixtures thereof directly into molten anhydrous ammonium nitrate for the recovery and reuse of a large volume of ammonia resulting from the use of a large excess of such oxides, and metering the resulting molten ammonium, magnesium or calcium nitrates into an anhydrous ammonium nitrate melt to reduce the alkaline earth metal nitrate content to that required for the stabilization function. A further object is to provide a process in which no evaporation of water under difficult conditions is required. Other specific objects and advantages will become apparent as the specification proceeds.

An advantage of this process is that no evaporation of water is required in producing the composition required for rendering the ammonium nitrate dimensionally stable, i.e., $Mg(NO_3)_2 \cdot H_2O$. The preparation of anhydrous ammonium nitrate is therefore unaffected by the addition of aqueous solutions of $Mg(NO_3)_2$ or the presence of $Mg(NO_3)_2$ in aqueous ammonium nitrate solutions. Preparation of anhydrous ammonium nitrate from an aqueous solution of ammonium nitrate can be achieved in any type of commercial evaporator, but it is preferred to use a vertical falling-film steam evaporator with hot air flowing countercurrently to the molten ammonium nitrate and thereby achieve increased rates of heat transfer and more economical operation than available with steam alone. This type evaporator, although economical, cannot be used if $Mg(NO_3)_2$ is present in the aqueous ammonium nitrate solution, since a vacuum evaporation system is required. Use of vacuum systems can and do result in large $NH_3$ losses.

A further advantage of this process is that a large portion of the mole of water that is formed in the reaction with alkaline earth metal oxide is evaporated without any special equipment or procedure required. Using the scope of this invention, it is possible to obtain a solution of $Mg(NO_3)_2$—$NH_4NO_3$ which contains less moisture than heretofore possible. It should be noted that although this additional decrease in water content is an advantage and is useful in the implementation of this invention, the initial composition, $Mg(NO_3)_2 \cdot H_2O$ is sufficient to render the ammonium nitrate dimensionally stable if care is taken to avoid moisture absorption by the resultant product.

A further advantage of this process is that no significant increase in reactor size and retention time is required to achieve a concentration of 20 to 40% $Mg(NO_3)_2$ in ammonium nitrate in comparison with directly reacting the oxide to obtain a 2% $Mg(NO_3)_2$ concentration.

In one embodiment of the invention, an alkaline earth metal oxide, such as magnesium or calcium oxide or mixtures thereof, is mixed with molten anhydrous ammonium nitrate in a stirred reactor fitted with a gas collecting system and fan for removing the ammonia fumes liberated in the reaction. As a specific example in which magnesium oxide is added, the following is illustrative of the reaction:

$$MgO + 2NH_4NO_3 \rightarrow Mg(NO_3)_2 \cdot H_2O + 2\overline{NH_3}$$

In this reaction, the mole of water which is formed is shown as a hydrate of $Mg(NO_3)_2$. In other discussions within this specification, it is pointed out that a substantial portion of this water leaves with the two moles of $NH_3$ in the course of the reaction.

A large excess of the magnesium or calcium oxide or mixture thereof is added in order to evolve the ammonia fumes in large volume so that they may be recycled to the nitric acid neutralizer and thus retained in the process. While the ammonium nitrate is effectively stabilized by having only about 2 percent by weight of the alkaline earth metal nitrate (equivalent to about 0.6% MgO), we prefer to add in the above-mentioned reaction an 8- to 24-fold excess of the earth metal oxide required to achieve the desired stabilization. For example, instead of adding 0.6 percent MgO, we prefer to add about 6 to 12 percent MgO so that in the resulting reaction there is a liberation of the ammonia in a single stage and in large volume. While the excess of the alkaline earth metal oxide may be as low as 6-fold, we prefer to employ a greater excess, and preferably about 10–20 fold excess of the oxide by weight.

The reaction mixture, which in the example shown above now consists principally of molten ammonium and magnesium nitrates, is held in the temperature range of about 110° to 200° C., and prefreably at about 150° to 180° C., until the reaction is substantially complete. The reaction temperature is limited by the freezing point of the solution and the decomposition temperature of amomnium nitrate. The completeness of the reaction is a function of the reactivity of the earth metal oxide, but can be determined by several simple and ordinary analytical techniques. An average period of reaction is about one hour, although the bulk of the reaction occurs in a period substantially less than sixty minutes.

Reaction rate studies, as illustrated in Table I below, have shown in addition that the higher concentration of added MgO results in a greater utilization of reactor volume which in turn gives greater reactor capacity. This improvement can readily be seen if the amount of $$Mg(NO_3)_2$$

formed is expressed as units of Mg reacted per unit time per unit reactor volume.

TABLE I.—REACTION OF MgO AND NH₄NO₃

[Data on reaction time and Mg conversion]

| Run No. | NH₄NO₃, gm. | MgO, gm. | Reaction Temp., °C. | Reaction Time, mins. | Mg(NO₃)₂,[1] percent | Final Analysis Percent Mg | Final Analysis Percent H₂O | Final Analysis Percent H₂O Insol. | pH 4% Sol'n. | Mol. Ratio, H₂O/Mg | Conversion, Percent |
|---|---|---|---|---|---|---|---|---|---|---|---|
| M-19 | 99.9 | 0.7 | 180 | 6 | 2.58 | 0.38 | 0.95 | 0.00 | 6.7 | 3.3 | 90.0 |
| M-18 | 99.9 | 0.7 | 180 | 10 | 2.58 | 0.68 | 0.73 | 0.02 | 6.2 | 1.4 | 100 |
| M-17 | 99.9 | 0.7 | 175 | 15 | 2.58 | 0.39 | 0.76 | 0.02 | 6.5 | 2.6 | 92.2 |
| M-22 | 99.7 | 3.0 | 186 | 5 | 11.2 | 1.67 | 2.11 | 0.11 | 8.1 | 1.7 | 90.8 |
| M-21 | 100.1 | 3.0 | 184 | 10 | 11.1 | 1.62 | 3.54 | 0.02 | 7.6 | 2.9 | 88.2 |
| M-20 | 99.7 | 3.0 | 178 | 20 | 11.2 | 1.63 | 0.64 | 0.02 | 7.4 | 0.5 | 88.7 |
| M-25 | 101.1 | 6.0 | 180 | 10 | 22.1 | 3.65 | 2.75 | 0.20 | 8.5 | 1.0 | 100.0 |
| M-24 | 101.1 | 6.0 | 176 | 20 | 22.1 | 3.08 | 0.19 | 0.19 | 6.6 | 0.9 | 84.6 |
| M-23 | 100.7 | 6.0 | 182 | 30 | 22.2 | 3.12 | 1.58 | 0.12 | 8.0 | 0.7 | 85.7 |
| M-28 | 99.6 | 9.0 | 180 | 5 | 34.1 | 4.4 | 3.70 | 0.43 | 8.8 | 1.1 | 78.6 |
| M-31 | 99.6 | 9.0 | 178 | 10 | 34.1 | 4.72 | 3.91 | 0.32 | 7.0 | 1.1 | 84.2 |
| M-27 | 100.2 | 9.0 | 176 | 15 | 33.9 | 5.0 | 2.85 | 0.20 | 8.6 | 0.8 | 90.0 |
| M-26 | 100.8 | 9.0 | 176 | 30 | 33.6 | 5.0 | 4.32 | 0.20 | 8.6 | 1.1 | 90.7 |
| M-29 | 104.0 | 13.6 | 180 | 33 | 50.0 | 7.35 | 3.90 | 0.46 | 8.8 | 0.7 | 89.5 |
| M-33 | 98.6 | 6.0 | 176 | 10 | 22.8 | 2.85 | 1.85 | 1.03 | 8.4 | 0.9 | 76.2 |
| M-32 | 101.0 | 9.0 | 184 | 15 | 33.6 | 4.62 | 2.36 | 1.29 | 8.5 | 0.7 | 83.2 |
| M-35 | 100.0 | 9.0 | 188 | 60 | 33.9 | 5.7 | 0.47 | | 7.3 | [2] 0.1 | 100.0 |
| M-34 | 100.4 | 13.6 | 178 | 30 | 51.9 | 7.35 | 4.2 | 1.09 | 8.8 | 0.8 | 86.1 |
| M-36 | 101.4 | 13.6 | 182 | 60 | 51.3 | 8.5 | 1.84 | | 8.7 | [2] 0.3 | 100.0 |

[1] Calculated final composition, based on 100% Mg conversion. [2] H₂O analyses immediately after reaction.

After the reaction is completed, the resulting molten ammonium nitrate-earth metal nitrate or nitrates is metered into an anhydrous ammonium nitrate melt in order to reduce the resulting earth metal nitrate content to the desired low weight percent which is effective in stabilizing the product. In the illustration given in which magnesium oxide is added, the resulting melt, consisting of molten ammonium and magnesium nitrates (0.6% MgO) and a trace of water, is prilled or otherwise treated by techniques common to the ammonium nitrate composition art.

In another embodiment of the invention, an alkaline earth oxide, typically MgO, is mixed with molten ammonium nitrate and reacted as described in the previous emboidment. It is preferred to add sufficient MgO to produce a melt containing about 40% $Mg(NO_3)_2$ and about 60% ammonium nitrate. The stoichiometry of the above reaction shows that about 9 parts MgO to about 91 parts $NH_4NO_3$ are required. This method has the advantage of an even greater concentration of MgO in solution, a greater concentration of the $NH_3$ which is evolved. In addition, the handling temperatures required are about the same as for pure molten $NH_4NO_3$. The reaction mass, which consists principally of molten $NH_4NO_3$ and $$Mg(NO_3)_2$$

is held in the temperature range of 170–200° C., and preferably at about 185° C., until the reaction is complete. After the reaction is complete, the resulting melt is metered into an anhydrous ammonium nitrate melt to reduce the alkaline earth nitrate content to that level required for stabilization.

Higher concentrations of $Mg(NO_3)_2$ can be employed and are within the scope of this invention, but they require higher handling temperatures which can possibly result in decomposition of ammonium nitrate and create an unnecessary safety hazard.

In the foregoing processes, molten anhydrous ammonium nitrate may be prepared in any suitable manner. Aqueous ammonium nitrate prepared by reacting ammonia with nitric acid may be heated to evaporate the water content, and the anhydrous ammonium nitrate may then be divided into two streams, one stream being reacted with the excess of the alkaline earth metal oxide, and the other stream being combined with the molten ammonium and earth metal nitrate to reduce the content of the earth metal nitrate therein to the extent desired for the final product, preferably about 2 percent by weight.

Specific examples illustrative of the process may be set out as follows:

EXAMPLE I

About five and one-half parts by weight of magnesium oxide (reactive or chemical grade) were mixed with 94½ parts of anhydrous molten ammonium nitrate in a stirred reactor fitted with a gas collector system and fan to collect the ammonia fumes liberated by the following reaction:

$$MgO + 2NH_4NO_3 \rightarrow Mg(NO_3)_2 \cdot H_2O + \overline{2NH_3}$$

The above reaction products result in a composition of about 22 weight percent $Mg(NO_3)_2$ expressed on an anhydrous basis.

The ammonia fumes, evolved in large volume, were recycled to a nitric acid neutralizer so as to be retained in the process, the resulting aqueous ammonium nitrate being heated in an evaporator to vaporize water and produce anhydrous ammonium nitrate.

The stirred reaction mixture, consisting principally of molten ammonium and magnesium nitrates, was held in the temperature range of 130–150° C. In about an hour, it was found by chemical analysis that the reaction was complete. The master batch was then metered into an anhydrous ammonium nitrate melt, leaving the above-mentioned evaporator or concentrator in a weight ratio of about 1:9. The resulting melt consisting of molten ammonium nitrate, magnesium nitrate, and a trace of water was prilled to produce the desired free-flowing granular stabilized ammonium nitrate product.

The oxide added in the above example provides a eutetic composition in the anhydrous phase system, $$Mg(NO_3)_2 - NH_4NO_3$$

which we prefer to use in one embodiment of this invention. This eutetic occurs at 22 weight percent of magnesium nitrate or approximately 6 percent by weight equivalent MgO.

EXAMPLE II

The process described in Example I was carried out, except that about 9 parts by weight of MgO were mixed with 91 parts of anhydrous molten ammonium nitrate. The reaction was conducted at about 185° C. The master batch, after completion of the reaction, was metered into molten ammonium nitrate in a weight ratio of about 1:19. The resulting melt was prilled to produce a free-flowing, stabilized ammonium nitrate product.

EXAMPLE III

The process was carried on as described in Example I except that calcium oxide was employed and the temperature was maintained at about 180° C. Comparable results to those described in Example I were obtained.

EXAMPLE IV

The process was carried out as described in Example I except that instead of employing magnesium oxide alone, a mixture of magnesium oxide and calcium oxide was employed, with the mixture in the same proportion by weight as described in Example I. A prilled, free-flowing, dimensionally-stable ammonium nitrate composition was obtained.

EXAMPLE V

The process was carried out as described in Example II, except that CaO or mixtures of CaO and MgO were employed.

EXAMPLE VI

The process described in Example I was carried out, except that about 9½ parts by weight of MgO were mixed with 90½ parts of anhydrous molten ammonium nitrate. The master batch, after completion of the reaction, was metered into molten ammonium nitrate in a weight ratio of about 1:53. The resulting melt was prilled to produce a free-flowing stabilized ammonium nitrate product containing magnesium nitrate in a concentration of about two-tenths percent by weight equivalent MgO.

EXAMPLE VII

The process was carried out as described in Example VI, except that the master batch, after completion of the reaction, was metered into molten ammonium nitrate in a weight ratio of about 1:35. A prilled, free-flowing, stabilized ammonium nitrate product containing magnesium nitrate in a concentration of about three-tenths percent by weight equivalent MgO was obtained.

In each of the processes described above, the difficult problem of evaporating water from ammonium nitrate melts containing magnesium or calcium nitrates was avoided, while at the same time the large volume of ammonia obtained by reacting the large excess of the earth metal oxide with the anhydrous ammonium nitrate was utilized in the nitric acid neutralizer for the forming of ammonium nitrate. The final anhydrous ammonium nitrate product has an equivalent alkaline earth metal content of at least 0.2 percent by weight and preferably about 0.2–0.4 percent by weight.

While in the foregoing specification we have set forth specific steps of the process in considerable detail for the purpose of illustrating phases of the invention, it will be understood that such details may be varied widely by those skilled in the art without departing from the spirit of our invention.

We claim:

1. In a process for preparing stabilized ammonium nitrate in which anhydrous ammonium nitrate is prepared by neutralizing nitric acid with ammonia and the resulting ammonium nitrate concentrated to anhydrous ammonium nitrate, the steps of reacting a portion of said anhydrous ammonium nitrate with about 6–24 fold excess of an alkaline earth metal compound selected from the group consisting of magnesium and calcium oxides and mixtures thereof and alkaline earth metal carbonates and hydroxides with agitation whereby a large volume of ammonia is liberated in said reaction stage and ammonium and alkaline and alkaline earth metal nitrates are formed, recycling said liberated ammonia to said neutralizing stage for neutralizing nitric acid, and metering said ammonium earth metal nitrates into said first-mentioned concentrated anhydrous ammonium nitrate to reduce the equivalent alkaline earth metal content to not less than about 0.2 percent by weight.

2. The process of claim 1 in which said equivalent alkaline earth metal content is about 0.2–0.4 percent by weight.

3. In a process for preparing stabilized ammonium nitrate in which anhydrous ammonium nitrate is prepared by neutralizing nitric acid with ammonia and the resulting ammonium nitrate concentrated to anhydrous ammonium nitrate, the steps of reacting a portion of said anhydrous ammonium nitrate with about 6–20 fold excess of alkaline earth metal oxide selected from the group consisting of magnesium and calcium oxides and mixtures thereof, said excess being 6–20 times the amount of oxide required to stabilize the final ammonium nitrate product, agitating the mixture whereby a large volume of ammonia is liberated in said reaction stage and ammonium and alkaline earth metal nitrates are formed, recycling said liberated ammonia and reusing the same in said initial step of neutralizing nitric acid, and metering said ammonium and alkaline earth metal nitrates into said concentrated anhydrous ammonium nitrate to reduce the equivalent alkaline earth metal content to not less than 0.2 percent by weight.

4. The process of claim 3 in which the excess of alkaline earth metal oxide is in the range of 10–20 times the amount of oxide required to stabilize the final ammonium nitrate product.

5. The process of claim 3 in which the alkaline earth metal oxide and anhydrous ammonium nitrate are heated to about 110–200° C. for liberating said ammonia at a single stage.

References Cited
UNITED STATES PATENTS

| | | | |
|---|---|---|---|
| 3,018,164 | 1/1962 | Guth | 23—103 |
| 3,030,179 | 4/1962 | McFarlin et al. | 23—103 |
| 3,173,756 | 3/1965 | Griffith | 23—103 X |

OSCAR R. VERTIZ, *Primary Examiner.*

A. J. GREIF, *Assistant Examiner.*

U.S. Cl. X.R.

71—64

UNITED STATES PATENT OFFICE
CERTIFICATE OF CORRECTION

Patent No. 3,428,418                                      February 18, 1969

Richard F. McFarlin et al.

It is certified that error appears in the above identified
patent and that said Letters Patent are hereby corrected as
shown below:

Column 1, line 18, "ammouium" should read -- ammonium --; line 45,
"accomplished" should read -- accompanied --. Columns 3 and 4, TABLE I, eighth col
line 8 thereof, "0.19" should read -- 2.19 --; same table, Footnote 2, after
"analyses" insert -- run --. Column 4, line 36, "prefreably" should read
-- preferably --. Column 5, line 14, "emboidment" should read -- embodiment -
Column 7, line 13, cancel "and alkaline", second occurrence; line 16, after
"ammonium" insert -- and alkaline --.

Signed and sealed this 24th day of March 1970.

(SEAL)
Attest:

Edward M. Fletcher, Jr.                           WILLIAM E. SCHUYLER, JR.
Attesting Officer                                     Commissioner of Patents